United States Patent [19]

Ugo et al.

[11] Patent Number: 4,732,880
[45] Date of Patent: Mar. 22, 1988

[54] METHOD FOR THE NEUTRALIZATION OF A-ZEOLITE OBTAINED IN SYNTHESIS PLANTS

[75] Inventors: Nistri Ugo, Genoa; Colombo Paolo, Saronno; Da Col Lino, Silea, all of Italy

[73] Assignee: Mira Lanza S.p.A., Genoa, Italy

[21] Appl. No.: 766,418

[22] Filed: Aug. 16, 1985

[30] Foreign Application Priority Data

Sep. 12, 1984 [IT] Italy ................................ 12598 A/84

[51] Int. Cl.$^4$ .......................... B01J 29/06; B01J 20/18
[52] U.S. Cl. ................................... 502/62; 252/174.25
[58] Field of Search ............... 502/60, 62; 252/174.15, 252/174.16, 174.25

[56] References Cited

U.S. PATENT DOCUMENTS

| 4,231,887 | 11/1980 | Denny et al. | 252/174.25 |
| 4,264,480 | 4/1981 | Andree et al. | 252/174.25 |
| 4,280,920 | 7/1981 | Garvey et al. | 252/174.25 |
| 4,392,974 | 7/1983 | Hachmann | 252/174.25 |
| 4,405,483 | 9/1983 | Kuzel et al. | 252/174.25 |
| 4,524,010 | 6/1985 | Reuter et al. | 252/174.25 |
| 4,529,541 | 7/1985 | Wilms et al. | 252/174.25 |

Primary Examiner—Carl F. Dees
Attorney, Agent, or Firm—Spencer & Frank

[57] ABSTRACT

The filter press cake, obtained by separation of the raw Zeolite from the major portion of the mother liquor and not washed, or only partially washed, is additivated with a suitable surface-active agent, added in the amount of from 1 to 2% in weight on the weight of the wet Zeolite. The thus-fluidized Zeolite is treated in a high-turbulence zone with sulphuric acid at a concentration greater than 70%, which is added in such an amount as to produce a nearly complete neutralization of the final Zeolite.

10 Claims, No Drawings

METHOD FOR THE NEUTRALIZATION OF A-ZEOLITE OBTAINED IN SYNTHESIS PLANTS

BACKGROUND OF THE INVENTION

The present invention relates to the production of A-Zeolite, and more particularly to a method for the neutralization of A-Zeolite obtained in synthesis plants.

According to the known manufacturing processes, A-Zeolite is synthetized in an aqueous environment of free NaOH. At the end of the reaction an excess of NaOH remains, the presence of which is necessary during the reaction step in order to complete the crystallization process.

In order that A-Zeolite may be handled and used in detergents, same should be deprived from the alkalinity in excess.

According to the known technologies, this operation is performed by washing with demineralized water the filter press or centrifugation cakes up to complete NaOH removal.

The disadvantages of the above procedure are manyfolds. One of these is due to the fact that great energy requirements are requested in the filtration and/or centrifugation step.

Another derives from the necessity of recovering or of treating large amounts of cake washing water, of low NaOH content.

Moreover, after drying, aggregate powders having low apparent density are obtained, which are difficult to be handled, and which form deposits on the fabrics washed with the detergents containing the said Zeolites. It has been proposed to simplify the above process by separating by filtration and/or centrifugation the raw Zeolite from the major amount of the still concentrated mother liquor, without washing it, or by washing it only partially, and by neutralizing with a suitable acid the residual NaOH which impregnates the cake.

The above solution presents however practical difficulties due to the extreme instability of the A-Zeolite in a strong acid environment, so that the neutralization must be performed avoiding the accumulation of neutralizing agents in order as not to fall below (at any point of the system) of a safety pH value (minumum pH value=10).

In order to do so it is necessary to assure the perfect dispersion of the acid throughout the whole mass of Zeolite under treatment.

According to a known prior art process, which is the object of the Japanese Pat. No. 80/27818 in the name of Fuji Davison Kagaku K.K., the Zeolites for detergency are prepared by pulverization of synthetic Zeolites in a fluid energy mill with concurrent neutralization of the said Zeolites by means of sulphuric acid which is sprayed in said mill.

The obtained final products have a water content of from 22.6 to 29.8% and a pH (aqueous solution at 1% of the slurry) of 10.4–11.2.

The above process in which sulphuric acid sprays are used, requests substantially critical working conditions.

It has also been proposed, according to another prior art process described in the German patent application No. 2.412.838, to treat a slurry containing Zeolites and other components of a detergent, with carbon dioxide in order to transform the excess of alkali into sodium carbonate. However, the said process based on the use of a weak acid as neutralizer has the disadvantage of the presence of the sodium carbonate in the final product, which gives rise to problems with the current detergent formulations.

Finally, according to the French patent application No. 2.499.123 on the name of Colgate Palmolive, it has been proposed to utilize, as neutralizing substance for the excess of NaOH present on the particles of A-Zeolite, tridecyl benzenesulphonic acid. The said process is however very expensive, due to the very large amount of tridecyl benzenesulphonic acid requested for the neutralization step.

SUMMARY OF THE INVENTION

The present invention has for its object a neutralization process for A-Zeolites obtained in synthesis plants, according to which to the filter cakes of synthetic A-Zeolite, impregnated with the alkaline mother liquor, a fluidizing agent is added, selected from the class of the surface-active substances, and the thus obtained suspension is subjected to neutralization with a strong acid, and preferably with sulphuric acid, in very short times, so as to complete the neutralization of the NaOH without damaging the Zeolite.

According to a further characteristic feature of the present invention, in order to assure the homogeneity and the perfect fluidification of the Zeolite to be neutralized, and in order to minimize the consumption of fluidizer, one portion of the already fluidized and neutralized A-Zeolite from a preceding batch, is recycled in the fluidification and neutralization zone.

The slurry obtained is still sufficiently fluid so as to be stored and conveyed by means of the conventional plants.

The fluidized and neutralized slurry obtained according to the invention may be used directly fo the preparation of detergents by spray-drying, or may be dried.

The fluidizer used is also useful as surface-active substance in the detergent composition, and the acid is selected among those which are apt to form useful salts for the detergent formulation.

Preferably, as mentioned, as acid sulphuric acid is used, with production of sodium sulphate during the neutralization step, the latter being a component of the detergents.

Of course, also other acids may be used, as for instance phosphoric acid.

As fluidizers, surface-active substances are used, and particularly sodium dodecyl benzenesulphonate, soduim alkyl benzenesulphonate, sulphonated alcohols, etoxylated alcohols, sulphonated etoxylated alcohols, etoxylated alkyl-phenols, sulphonated etoxylated alkyl-phenoles.

The powder obtained by drying the slurry according to the invention has a grain size distribution comprised between 100 and 1500 microns, which is typical of powders which may be easily handled, and which therefore is remarkably better than that of A-Zeolite thoroughly washed and dryed, the grain size of which is practically comprised between 1 and 10 microns.

The apparent density of the Zeolite obtained with the process according to the invention is comprised between 0.5 and 0.65 grams/ml. It has a granular appearance and is free flowing.

The neutralization performed according to the present invention with strong acids (sulphuric acid), does not give rise to important modifications in the stability of the neutralized A-Zeolite.

The parameter which may be used to control the efficency of the operation is the sequestering power for the calcium salts of the neutralized Zeolite.

The lowering of the said power which takes place after the neutralization reaction is minimum, and generally contained within 2.5%–3%.

The fluidizer is employed in the concentration range of between 0.05 and 10% on weight, based on the weight of the treated A-Zeolite, and preferably between 0.1 and 2%.

The presence of the salt from the neutralization reaction, as for instance the soduim sulphate whenever sulphuric acid is used as neutralizing agent, is of assistance in the formation of an agglomerated compound which is easily dispersable in water with regeneration of the grain size of the starting A-Zeolite.

DESCRIPTION OF SOME PREFERRED EXAMPLES OF THE INVENTION

The process according to the invention will be better evident from the following examples, given by way of illustration and not of limitation of the inventive process.

EXAMPLE NO. 1

A cake obtained by filtration of a raw suspension of A-Zeolite from a synthesis reactor and containing 3.2% of free sodium hydroxide (expressed as sodium oxide) and 50.0% of A-Zeolite, was mixed continuously at the rate of 1500 Kg/h with 21.4 Kg/h of soduim dodecyl benzenesulphonate of title 42% and thereafter treated in a high-turbulence zone with 87.9 Kg/h of sulphuric acid at 76.0%.

The sequestering power, referred to the anhydrous Zeolite, of the obtained product was of 306 mg of calcium carbonate per gram, against the starting value of 312 mg of calcium carbonate per gram.

The sequestering value was determined by exchanging for 15' at 20°–22° C. whilst stirring, 0.2 gr of slurry with 100 ml of water of hardness 50° F. (from calcium alone) buffered at pH=10.

After separation of the exchanged Zeolite, the calcium in excess was titred with EDTA.

EXAMPLE NO. 2

A slurry of A-Zeolite, obtained according to the process referred in example No. 1 and containing 46.6% of A-Zeolite (containing in turn 20% of crystallization water), 6.3% of sodium sulphate and 46.4% of free water, was continuously fed to a spray-drying plant. A compound of A-Zeolite was obtained as final product, having the following characteristics:

A-Zeolite content=82.1%
free water content=4.9%
natrium suphate content=11.1%
apparent density=0.50 Kg/liter
grain size over 1410 microns=0.6%
grain size between 1410 and 500 microns=16.0%
grain size between 500 and 250 microns=51.5%
grain size between 250 and 150 microns=27.0%
grain size under 150 microns=4.9% which may be quickly dissolved in water.

We claim:

1. A method for the neutralization of a wet filter cake of alkaline A-Zeolites which are unstable in a strong acid environment comprising the steps of:

adding an effective amount of a surface-active agent to said wet filter cake of alkaline A-Zeolite to form an alkaline suspension of A-Zeolite, and quickly neutralizing said alkaline suspension of A-Zeolite with a strong acid to maintain a pH of at least about 10 to avoid damage to said A-Zeolite.

2. The method according to claim 1, wherein said surface active agent is selected from the group consisting of sodium dodecyl benzenesulphonate, sodium alkyl benzenesulphonate, sulphonated alcohols, ethoxylated alcohols, sulphonated ethoxylated alcohols, ethoxylated alkyl-phenols, and sulphonated ethoxylated alkyl-phenols.

3. The method according to claim 1, wherein said strong acid is concentrated sulphuric acid or concentrated phosphoric acid.

4. The method according to claim 1, wherein the said surface-active agent is added to the A-Zeolite in an amount of from 0.05 to 10% by weight based on the weight of the wet A-Zeolite.

5. The method according to claim 1, including recycling a portion of the suspension of neutralized A-Zeolite to said alkaline suspension.

6. The method according to claim 1, wherein said alkaline suspension of A-Zeolite is formed and neutralized in substantially concurrent times.

7. The method according to claim 1, wherein said surface active agent is added to the A-Zeolite in the amount of from 0.1 to 2% by weight based on the weight of the wet A-Zeolite.

8. The method according to claim 1, wherein said alkaline A-Zeolite is a wet filter cake obtained from a synthesis plant.

9. The method according to claim 8, wherein said wet A-Zeolite filter cake consists of synthetic A-Zeolite from a high-mixing energy plant.

10. The method according to claim 1, including drying said neutralized suspension to obtain a powder having a grain size distribution between 100 and 1,500 microns.

* * * * *

UNITED STATES PATENT AND TRADEMARK OFFICE
CERTIFICATE OF CORRECTION

PATENT NO. : 4,732,880
DATED : March 22, 1988
INVENTOR(S) : Ugo Nistri, Paolo Colombo, and Lino Da Col It is certified that error appears in the above-identified patent and that said Letters Patent is hereby corrected as shown below:

In the heading, the inventors names should read:

[75] Inventors: Ugo Nistri, Genoa;

Paolo Colombo, Saronno; and

Lino Da Col, Silea, all of Italy

Signed and Sealed this

Twelfth Day of July, 1988

*Attest:*

DONALD J. QUIGG

*Attesting Officer*     *Commissioner of Patents and Trademarks*